United States Patent [19]

Rappoport

[11] Patent Number: 5,766,687

[45] Date of Patent: Jun. 16, 1998

[54] LIQUID EBONITE ANTICORROSIVE COATING FOR METALS

[75] Inventor: Leonid Rappoport, Mountain View, Calif.

[73] Assignee: MMR Technologies, Inc., Mountain View, Calif.

[21] Appl. No.: 754,216

[22] Filed: Nov. 20, 1996

[51] Int. Cl.$^6$ .................................................. B05D 3/02

[52] U.S. Cl. .................................................. 427/386

[58] Field of Search ................ 427/386; 524/251, 524/252, 495, 496; 523/213, 438; 152/209 R

*Primary Examiner*—Bernard Pianalto
*Attorney, Agent, or Firm*—Lumen Intellectual Property Services

[57] ABSTRACT

A mixture comprising epoxidized liquid rubbers, amine hardeners and sulfur applied to a metal and cured produces a coating that is highly durable and provides strong anticorrosive protection to the metal. The amine hardeners serve to activate and dissolve the sulfur, speed up the curing time, and also bond to the rubbers to create a continuous molecular matrix. The activated sulfur also links the rubber molecules together, as well as anchoring the polymer matrix to the metal substrate via chemical bonds. In a preferred embodiment, the formulation also includes two types of accelerators which act synergistically to further reduce the curing time to less than one hour. The addition of micronized aluminum oxides provides increased uniformity of heating during curing and results in a more uniform coating. The addition of calcium oxide together with the presence of amines and aluminum oxide provides a complete absorption of acidic gases produced during curing. The addition of high molecular butadiene nitrile rubber increases the coatings impact resistance, low-temperature flexibility, and adhesion.

11 Claims, 3 Drawing Sheets

LIQUID EBONITE ANTICORROSIVE COATING FOR METALS

This invention was supported in part by Navy contract N00014-93C-2160. The Government has certain rights in the invention.

FIELD OF THE INVENTION

This invention relates generally to the creation of protective coatings for metals. More particularly, it relates to the use of amines to improve rubber vulcanization, and to anticorrosive rubber coatings designed to protect metals from aggressive action of chemicals such as alkalis, acids, salts, solvents, oils, gasoline and contaminated water.

BACKGROUND OF THE INVENTION

There is a pervasive and continuing need for protecting metals from corrosive chemical action, such as in metal pipes, stacks, chimneys, bridges, chemical plant constructions, ship hulls, and containers for aggressive chemicals, to name just a few. In addition to having a high resistance to chemical action, an ideal coating has certain other properties: the raw materials required to produce the coating are commercially available, inexpensive and non-hazardous; the coating has the ability to be easily applied to the metal, e.g. by spraying, spreading, or free casting; the coating has strong adhesion to many different metals; it is strong, hard, abrasive resistant and thermostable; and the hardening process of the coating is capable of being carried out in contact with moisture, does not require extreme or long heating, and does not release toxic fumes. An ideal metal coating may have many additional properties, depending on the particular application or purpose of the coating.

The most widespread anticorrosive coatings possessing many of the above properties are polyurethanes and epoxide resins (see for example, *Coating Systems: A guidance Manual For Field Surveyors*, American Bureau of Shipping and Affiliated Companies, 1995). These coatings have good chemical resistance to many substances, have adhesion to metals that is satisfactory for many purposes, and have good mechanical properties. Neither polyurethanes nor epoxide resins, however, satisfy all the criteria for an ideal coating for metal. In particular, although polyurethanes have outstanding oil-gasoline resistance, a unique combination of favorable physical-mechanical properties, and strong adhesion to some metals, they are not stable under elevated temperature changes, alkaline hydrolysis, and persistent tension. Epoxide resins, although they have outstanding adhesion to some metals, do not have a satisfactory resistance to acids, certain solvents, temperature changes, and vibration. One of the most significant problems associated with both epoxide resins and polyurethanes is their susceptibility to underfilm corrosion connected with defects in the coating surface. Because these coatings are bonded to the metal only by adhesive bonding, these bonds can be broken by the introduction of moisture, solvents or other substances.

As is known from rubber chemistry (*Encyclopedia of Polymer Science & Technology*, John Wiley & Sons, N.Y., vol 12, p. 161, 1970), solid ebonite, commonly known as hard rubber, is a polymer material with sulfur content used for vulcanization. Ebonite, like elastomeric or flexible rubber, is made from a combination of sulfur with polydienes (unsaturated rubbers containing double bonds). The sulfur and polydienes are combined with some auxiliary additives and heated to produce vulcanization. Typical mass ratios of sulfur to rubber are 2:100 for elastomeric rubber and 40:100 for hard rubber. Due to the large degree of sulfide cross-linking formed in the vulcanization process, solid ebonite is a hard, non-flexible, plastic-like material possessed of unique chemical resistance to aggressive substances such as acids, alkalis, salt solutions, oil, and gasoline. In addition, solid ebonite has good mechanical properties. Consequently, these conventional rubbers are commonly used as materials for fuel tanks, containers for aggressive substances, and other applications. In spite of these advantages, however, solid rubbers can not be easily applied to metal surfaces, they release toxic fumes during vulcanization, and they require a long time to harden.

More than 30 years ago liquid rubbers were synthesized. (See Alan R. Luxton, "The Preparation, modification and application of non-functional liquid polybutadienes", *Rubber Chemistry and Technology*, 54 (1981) 3, 596–626) Like earlier rubbers, liquid rubbers are formed from compounds such as polybutadiene, polyisoprene, butadiene-styrene, and butadiene-nitrile. In contrast to the hard rubbers, which are made from such compounds having molecular weights on the order of 100,000 to 500,000, the liquid rubbers are made from such compounds having molecular weights of only 2,000 to 4,000. Consequently, the low molecular rubbers permit castable processing by pouring, spreading, spraying, or rolling, while providing similar properties as the hard rubbers after curing. Liquid rubber, therefore, may be used to more easily coat metal surfaces.

A liquid ebonite formulation for coating metals was developed by Ju. N. Pushkarev, V. I. Anosoff, and A. L. Labutin, and described in their article "A vulcanization and the properties of ebonite coatings made on the base of liquid CiS-1,4-polybutadiene", *Caoutchouc and Rezina*, N3, 1979 (Russian). The formulation is prepared by mixing the components as shown in Table 1.

TABLE 1

| Compound | Mass Parts |
|---|---|
| Liquid polydiene rubber with hydroxyls or without functional groups | 100 |
| Sulfur | 40 |
| diphenylguanidine (accelerator) | 3 |
| Zinc Oxide (activator) | 5 |
| Cab-O-Sil (thixotropy agent) | 5 |
| white spirit (thinner; used sometimes) | 5–10 |

It is important to recognize that in this coating, the polydiene molecules 10 are only joined together by sulfur "bridges" 12 (See FIG. 1). Hence, the separate cured polydiene molecules do not connect entirely into a united network, but rather form fragmented structures. A fragmented structure in conventional cured liquid ebonite can cause non-uniformities in the final material. Additionally, being a heterogeneous system, this liquid ebonite formulation can not be transformed into a perfect uniform material. The existence of non-uniformities in the conventional cured liquid ebonite is likely a primary contributing factor to its insufficient durability under repeated loading and/or impact, making it unsuitable for certain important applications.

Another disadvantage of the prior art liquid ebonite is the long time required for curing. It requires 5–6 hours to cure at temperatures of 150° C. to 160° C. An invention sharply reducing the curing time was filed by L. Lubomirsky, M. Rozanoff and the present inventor in a Russian patent application N4.813.508/05/014085 entitled "Method for Producing Ebonite Coating" filed 31 Jan. 1991 and published 22 Oct. 1991. The inventors demonstrate that the curing time can be diminished to a few minutes. However, special devices (e.g., high frequency current generators) are required for its realization.

The curing process of liquid ebonite has also presented additional problems in the past. During the process volatile and toxic products are released, including hydrogen sulfide. Moreover, the release of gases during curing produces microcavities which reduce the strength and protective properties of the coating. Furthermore, since many applications require faster hardening times, these coatings are of limited use. In addition, such a long contact with heated metal often causes local destruction of the polymer coating, again weakening its protective properties.

Another disadvantage of prior liquid ebonite coatings lies in their suboptimal strength of adhesion to metal. Although the coatings adhere to some degree to the metal, the strength is not outstanding.

OBJECTS AND ADVANTAGES OF THE INVENTION

In summary, although some coatings in the prior art may have some of the properties desired of an ideal coating, none provides all the desired properties. Specifically, the desired conditions needed to improve on the coating properties of prior art liquid ebonite should incorporate the following:

1. The structure of the cured ebonite would not be fragmented, but rather a united three-dimensional matrix.
2. The initial liquid formulation would be more homogeneous.
3. The release of gases, most importantly hydrogen sulfide, would be minimized or eliminated entirely.
4. The flexibility and impact-resistance of the final product would be improved significantly.
5. The time of curing would be reduced from 5–6 hours down to less than 1 hour.
6. The bonding of sulfur with metal as a result of the chemical reaction would be more effective.

There is therefore a current need for a coating for metals that overcomes the disadvantages in the prior art, addressing these above specific points.

Accordingly, it is a primary object of the present invention to provide an improved method for protectively coating a metal. More specifically, it is an object of the present invention to provide a coating for metals that gives the metal a strong resistance to acids, certain solvents, temperature changes, and vibration. Further objects of the invention are to provide a coating for metals which has a strong resistance to underfilm corrosion, whose raw materials are readily available, inexpensive and non-hazardous, which may be easily applied to the metal, and which has a strong adhesion to many different metals. Additional objects of the present invention are to provide a coating for metals which is strong, hard, abrasive resistant and thermostable, and whose hardening process can be carried out in contact with moisture, does not require extreme or long heating, and does not release toxic fumes. These and other objects and advantages will become apparent from the following description and accompanying figures.

SUMMARY OF THE INVENTION

An aspect of the present invention is based on the surprising and novel combination of two phenomena. On the one hand, liquid rubbers use sulfur in the vulcanization process. On the other hand, sulfur forms bonds with most metals and their oxides, e.g. the ferric oxides, or rust. (See for example, Cotton and Wilkinson, *Advanced Inorganic Chemistry: A Comprehensive Text*, 3rd edition, Interscience Publishers, John Wiley & Sons, Inc., p. 427–430, 1972.) The use of liquid rubber to coat metal, therefore, introduces the possibility for a chemical reaction between a sulfur in the coating material and the metal or metal oxide that is being coated. Because chemical bonds are substantially stronger than adhesive bonds, a liquid rubber coating for metal has the potential to provide significantly increased protection. The present inventor appears to be the first to have recognized this possibility.

Moreover, the inventor has discovered new and useful techniques that realize such a possibility and attain the above objects and advantages. An essential aspect of the invention is the application of the activation of sulfur by amines to the process of producing rubber coatings for metal. The presence of amines breaks the closed-ring structure of virgin sulfur, producing a highly reactive linear sulfur chain dissolved in the amines. Because the sulfur is dissolved, the formulation is very homogeneous. In addition, because the sulfur is activated by the amine, it very easily forms bonds between many of the epoxidized liquid rubber molecules and anchors these clusters to the metal substrate, thereby reducing the curing time. In addition to activating and dissolving the sulfur, the amines also react with the epoxidized rubber, linking together the clusters to form a uniform and continuous matrix. The result is a unified polymer coating that is chemically bonded to the metal substrate. The coating comprises an epoxidized liquid rubber, an amine, and sulfur.

In a preferred embodiment, the epoxidized liquid rubbers are epoxidized polydienes, and the amines are polyamines. The addition of butadiene-nitrile rubber to the formulation introduces a high-molecular weight polymer "nerve" structure to the coating that increases its impact resistance, low-temperature flexibility, and adhesion to the metal. Since butadiene-nitrile rubber is not compatible with hydroxylated polydienes nor with non-functional polydienes, it was not possible to make this addition to prior art formulations. Butadiene-nitrile rubber is, however, compatible with epoxidized low-molecular weight polydienes, allowing the present invention to enjoy these advantageous properties.

The addition of micronized aluminum oxide (which has outstanding heat conductivity) improves the temperature uniformity during heating, and also assists in the thorough mixing of the other components of the mixture. Another additive, calcium oxide, absorbs hydrogen sulfide and the sulfur oxides. This action of calcium oxide enhances the similar absorbing properties of the polyamines and aluminum oxide. Two accelerators (2-mercapto benzothiazole and di-phenyl-guanidine) present in the mixture act synergistically to dramatically reduce the curing time. An activator (zinc oxide) helps initiate vulcanization, a thixotropic agent (cab-o-sil) makes the formulation easier to apply to the metal surface, and a thinner (white spirit) is sometimes used, depending on the specific end use of the coating.

A method for protecting a metal using a coating of the present invention includes dissolving sulfur in a liquid mixture comprising an epoxidized liquid rubber and an amine, applying the mixture to the metal to form a coating, and heating the coating until it hardens. In a preferred embodiment, the mixture contains additional components as described above. The relative proportions of the components in the preferred embodiment are as follows: epoxidized liquid rubber, 100 mass parts; sulfur, 30–35 mass parts; aluminum oxide, 5–10 mass parts; zinc oxide, 5–6 mass parts; cab-o-sil, 2–10 mass parts, polyamine, 2–6 mass parts; di-phenyl-guanidine, 2–3 mass parts; 2-mercapto benzothiazole, 2–3 mass parts; butadiene-nitrile rubber, 1–2 mass parts. In alternate embodiments, the relative proportions of these components are adjusted to suit the particular application. In other alternate embodiments one or more of the additional components are not present in the formulation.

DETAILED DESCRIPTION

Figure 1:
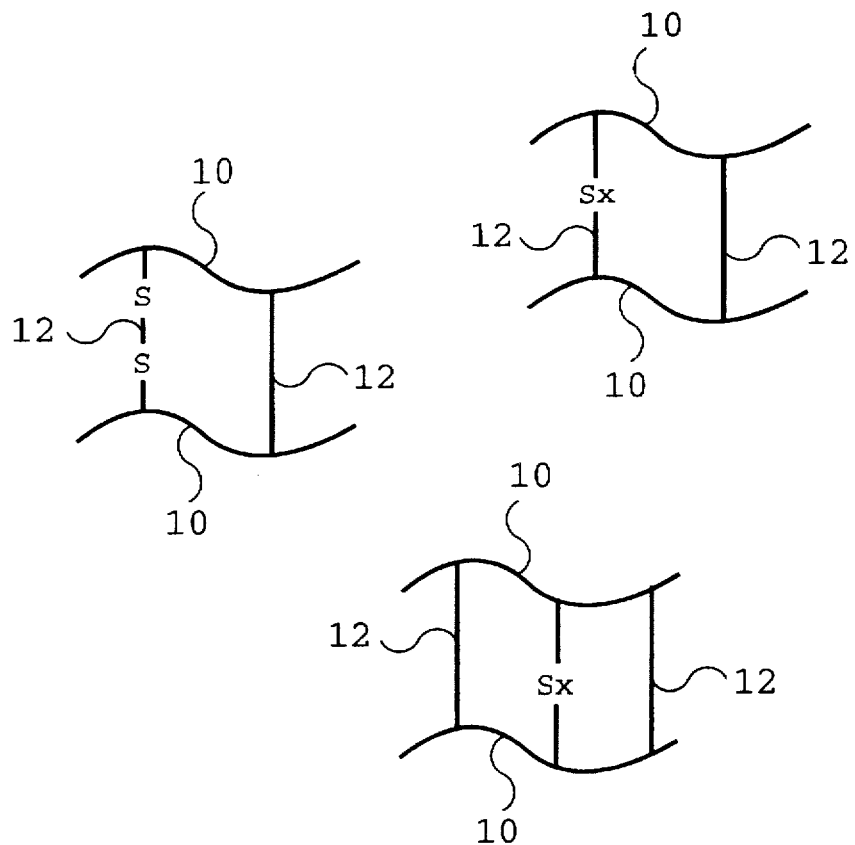
FIG. 1 shows rubber molecules bonded to each other by sulfur, as is the case in conventional rubber vulcanization.

In a preferred embodiment of the present invention, liquid epoxidized rubbers containing the epoxies are used in forming a protective coating. The examples of epoxidized low molecular weight liquid rubbers include Ricopoxy polymers (Ricon) and Poly BD-600 or -605 (Elf Atochem North America), which are commonly called the oxiranes (see Wheelock, C. E., *Industrial Eng. Chem.* vol. 50, N3, p. 299–304, 1958). These rubbers are substitutes for the non-functional or hydroxyl-containing derivatives used in the prior art. The consequences of this substitution are significant and provide many advantages, the most important of which are listed below.

1. As is well known, the epoxies react with amines (amine hardeners) vigorously (see Epoxy Resins: *Chemistry & Technology*, eds. Clayton A. May and Yoshio Tanaka, Marcell Dekker, Inc., N.Y., 1973, ch. 3–4). The amines consequently act as links between the molecules of liquid epoxidized rubber, resulting in the formation of a distributed matrix or network from the separate epoxidized rubber molecules and the clusters thereof. The formation of such a network provides the coating with desirable physical, chemical and mechanical properties. In particular, the continuous network has a higher resistance to penetration by aggressive agents.

2. The epoxidized derivatives of the present invention have an increased polar character. Therefore, they are compatible with more polar substances, for example with butadiene-nitrile rubber (BNR). Thus, in contrast with the prior art, it is possible to dissolve a small amount (1% to 5%) of BNR in the epoxidized liquid rubber, which improves the flexibility, pliability, adhesion to metal, durability, and thixotropy properties, the last of which improves the ease of application to metal surfaces.

3. Epoxies react with hydrogen sulfide. Consequently, rather than releasing hydrogen sulfide produced by the sulfur vulcanization reaction, the hydrogen sulfide bonds with the epoxies and reduces or eliminates these toxic emissions.

The present invention is also characterized by the use of amines to activate and dissolve sulfur in a vulcanization process. Although it was previously known that sulfur can be dissolved in certain low molecular weight amines, the inventor has discovered that sulfur may be dissolved in and activated by amine hardeners for epoxies and used to dramatically affect a vulcanization process, providing a metal coating with many important advantages, the most prominent of which are discussed below. Examples of amine hardeners for epoxies are the various types of Unirez (Union Camp Chemical Co), 1,3-meta-xylene diamine (MXDA), 1,3-bis(aminomethyl) cyclohexane (Mitsubishi Gas Chemical Companies), and poly(oxypropylene) amines (Jeffamines, Huntsman Corporation).

1. As a result of the dissolving of sulfur, the formulation becomes much more homogeneous. Consequently, the reaction between the sulfur and liquid rubber is improved. Moreover, the homogeneous distribution of sulfur results in a more uniform and perfect three-dimensional structure after curing.

2. Significantly, the dissolving is actually not only a physical process, but a chemical reaction as well that serves to activate the sulfur. In the virgin state, sulfur has the form of an 8-membered ring. The amines react with the sulfur by breaking this ring, transforming the sulfur ring into a very active linear chain. Consequently, the dissolving of the sulfur in the amine hardener activates the curing process, as well as activating the reaction of the sulfur with the metal substrate (see point 4 below). Since the polyamine hardener not only activates the sulfur, but also acts to link the epoxidized rubber fragments into a large matrix, it plays two important roles in producing the coating.

3. Since amines are good absorbents of acidic gases, such as hydrogen sulfide and sulfur oxides, the use of amines also reduces the amount of toxic fumes which may be released in the vulcanization process, as mentioned before.

4. Since activated dissolved sulfur is more reactive with metals than its virgin counterpart, it creates a chemical interface bonding the polymer matrix to the metal substrate. This intermediate metal-polymer layer plays an especially important role in preventing chemical corrosion (to be discussed further).

The preferred embodiment of the present invention is also distinguished by the use of two different types of accelerators. These accelerators used together result in a synergistic effect which provides significant acceleration of the curing process.

The inventor has also discovered that the addition of aluminum oxide to the formulation provides notable advantages, namely:

1. Aluminum oxide increases the heat conductivity and improves the temperature uniformity during the heating process. Consequently, the quality of the coating is improved.

2. Since Aluminum oxide is an abrasive material, the effectiveness of the mixing process is enhanced by its presence.

3. Aluminum oxide, together with calcium oxide, is an effective absorbent system for gases released during vulcanization.

In the preferred embodiment, the coating formulation is produced by mixing the compounds listed in Table 2 in the relative amounts indicated.

In contrast with Table 1, it is seen that the formulation of the present invention differs in the use of epoxidized rubber (FIG. 1) in place of liquid polydiene rubber with hydroxyls or without functional groups. In addition, the formulation of the invention contains additional components, namely, an amine hardener, micronized aluminum oxide, 2-mercapto benzothiazole, and butadiene-nitrile rubber. This unique formulation leads to important properties of the resulting coating, as will now be further described.

TABLE 2

| Compound | Description | Mass Parts |
| --- | --- | --- |
| epoxidized liquid rubber | coating building block | 100 |
| sulfur | vulcanizing agent | 30–35 |
| polyamine | hardener and solvent | 2–6 |
| micronized aluminum oxide | heat conducting agent | 5–10 |
| 2-mercapto benzothiazole | accelerator | 2–3 |
| di-phenyl-guanidine | accelerator | 2–3 |
| zinc oxide | activator | 5–6 |
| cab-o-sil (silica fine dispersed) | thixotropy agent | 2–10 |
| butadiene-nitrile rubber (chemigum) | elastifier | 1–2 |
| calcium oxide | absorber | 3–5 |

Figure 2:
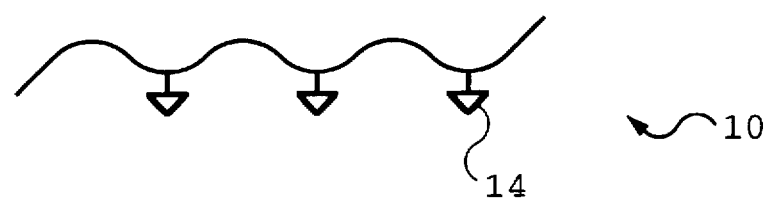
FIG. 2 shows a liquid rubber molecule with epoxy groups, as used in the present invention.
Figure 3:
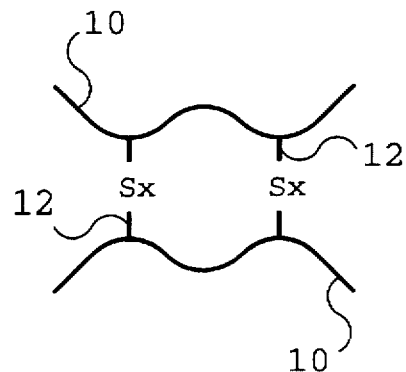
FIG. 3 shows two liquid rubber molecules bonded to each other by sulfur according to the present invention.
Figure 4:
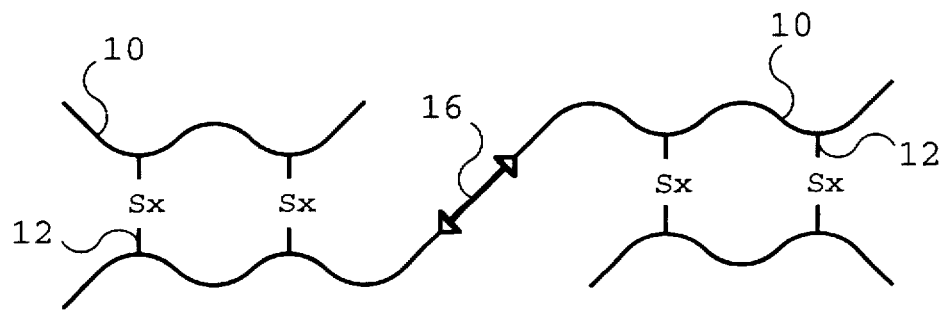
FIG. 4 shows a pair of rubber molecules bonded to another pair of rubber molecules by an amine molecule, according to the invention.

As shown in FIGS. 2–4, liquid rubber molecules 10 with epoxy groups 14 (FIG. 2) react with short activated sulfur chains 12 to form cross-linked clusters of rubber molecules (FIG. 3). These rubber molecule clusters are further bonded together (FIG. 4) by amines 16 to form a unified matrix. Typically, only part of the total amount of sulfur present in the formulation is used to form links between the rubber molecules. The remaining excess sulfur is dissolved in the sulfidized polymer as a result of the strong chemical affinity between the excess sulfur and the sulfur in the links. These sulfur bonds remain strong at temperatures up to the melting point of sulfur, i.e. up to more than 120° C.

Figure 5:
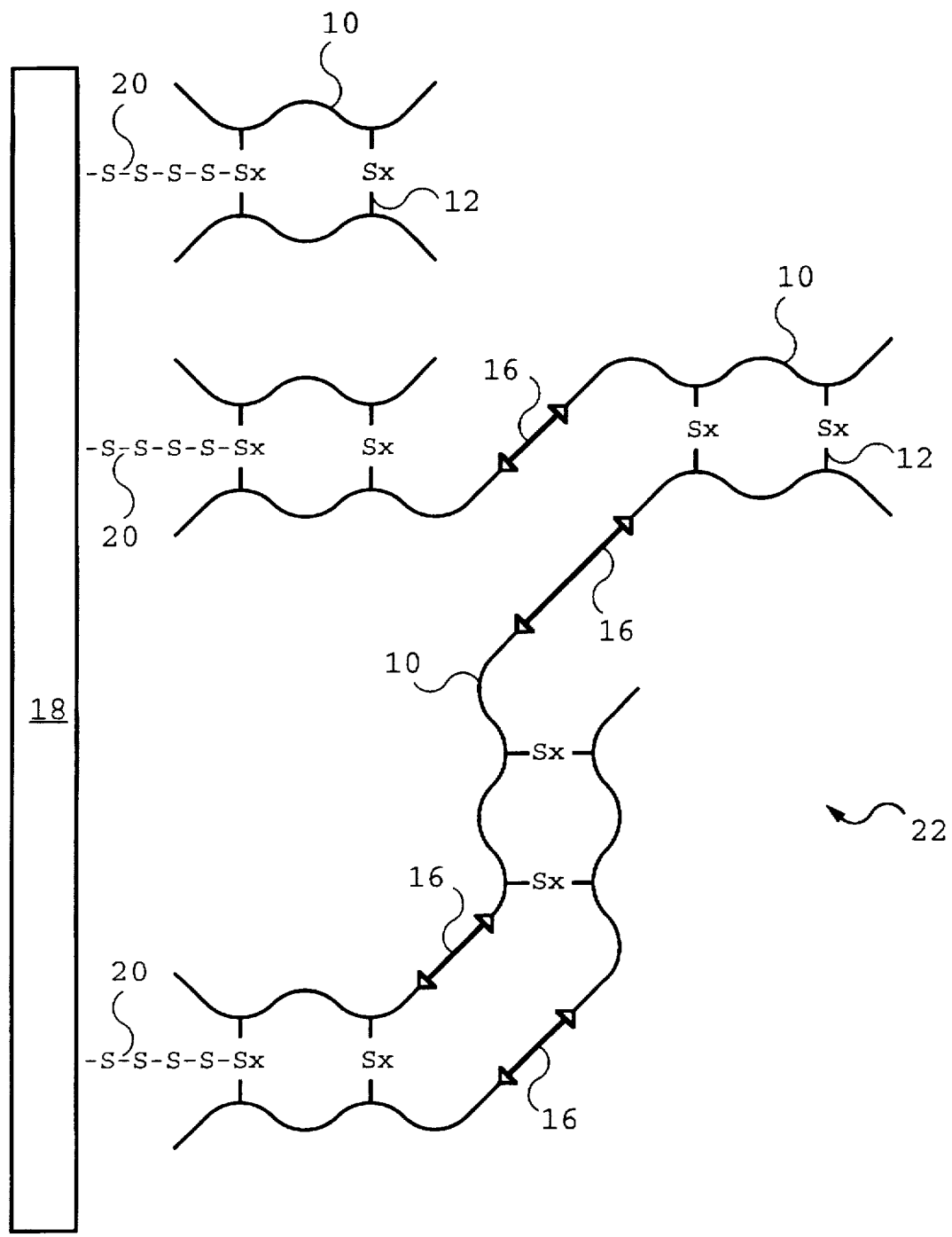
FIG. 5 shows a polymer matrix of rubber molecules, amines, and sulfur bonded to a metal substrate according to the invention.

On the other hand, at elevated temperatures the excess sulfur can react with all metals as well as with metal oxides. Consequently, as shown in FIG. 5, strong chemical bonding can be produced between the polymer matrix and a metal substrate 18, with the sulfur acting as an intermediary anchor 20 between the polymer matrix 22 and the metal 18. When applied to the metal surface in liquid form, the presence of a homogeneous distribution of dissolved sulfur is capable of producing a large number of anchors 20, resulting in a high density of polymer-metallic bonds. Consequently, the polymer coating is very strongly bonded to the metal substrate via this interface of anchors, resulting in an extremely high degree of durability and chemical resistance. Because the polymer-metal bond is chemical in nature, it is far superior to merely adhesive bonds which can be easily destroyed by temperature changes, vibration, chemicals, etc.

The metal-polymer interface can play another important role in anticorrosive protection. As it is known, to prevent electrochemical corrosion an electrically conductive primer must be applied to the metal before a separate main polymer coating is spread. For example, the electric semi-conductive polymer polyaniline is used as a primer to prevent the above mentioned type of corrosion (*Chemical & Engineering News*, pp. 17, 44–45, July 1996). The inventor, on the other hand, has found that the metal-polymer interface formed during the liquid ebonite hardening has semiconductive properties. Thus, in this case, the metal-polymer interface is effectively a semiconductive "primer" that is automatically formed between the metal substrate and polymer coating matrix. The automatic formation of this semiconductive interface is a very important advantage of the invention, effectively promoting its status to a universal protective coating not requiring the use of a separate primer coating. As mentioned before, the introduction of polyamine hardener in the liquid ebonite formulation enhances the semi-conductive layer formation by activating the sulfur and also enhances anticorrosion protection, especially protection from electrochemical corrosion, through the creation of bonds between the ebonite molecules.

Since the sulfur bonds to both metals and to metal oxides (including ferric oxide, or common rust), the coating has the unique and highly desirable property that it can be applied to metal surfaces which are partly oxidized. This remarkable feature eliminates the need to thoroughly clean the metal substrate of all oxides prior to application of the coating. Since such cleaning represents a large portion of the expense in traditional methods of coating metals, this feature dramatically reduces the cost and complexity of protecting metal surfaces.

Moreover, since grease and oil are readily dissolved in the liquid ebonite formulation, these impurities also need not be removed from the metal surface prior to the application of the coating. Because greases and lubricants have a similar chemical nature as the liquid rubbers (i.e. a hydrocarbon structure), both mentioned components are soluble in the liquid rubber formulation, absorbing and dissolving the remnants of grease from the metal surface. Although this capability is present in the case of non-polar non-functional liquid rubbers, the inventor has discovered that it is enhanced in the case of epoxidized liquid rubbers due to their polar character. Grease spread over a metal surface and exposed to the air may be transformed from a non-polar virgin product into slightly polar produce due to its oxidation. Since epoxidized rubbers, in contrast to the prior art rubbers, are slightly polar products also, the coating of the present invention has an improved capability for absorbing and dissolving surface oils and other similar compounds, thereby significantly increasing the protective properties of the coating.

Due to the nature of the formulation of the present invention, it is possible to easily vary certain properties of the coating by the simple adjustment of the ratio of components. For example, the flexibility and impact resistance can be enhanced by reducing the amount of sulfur or increasing the amount of butadiene-nitrile rubber.

Another important notable feature of the present invention is its simplicity of manufacture and application. The components required for the formulation are commercially available and can be simply mixed together without a large temperature rise, thereby preventing a premature vulcanization (so called "scorching"). In a preferred embodiment, an effective method to mix all components is as follows. First, each powder-like component except sulfur is separately mixed with an amount of liquid rubber, creating a few master batches. In another master batch, a portion of the sulfur is dissolved in the amine. Then these separate master batches are mixed together with the remaining amount of liquid rubber which has the remaining portion of sulfur dissolved in it. Obviously, this is one of many possible methods of mixing the components to produce the coating of the invention, and such methods will be evident to those skilled in the art upon reading the present description.

After all the components of the formulation are mixed, the resulting liquid is applied to a metal surface by any of many common techniques such as spreading, brushing, rolling or spraying. As explained previously, it is not necessary to completely clean the metal or otherwise treat it with any preliminary chemicals or agents. The thickness of the applied layer of the liquid formulation is preferably in the range of approximately 0.1 mm to 0.3 mm. A layer less than 0.1 mm thick can still provide protection but is typically difficult to apply. A layer more than 0.3 mm thick will provide protection but is not necessary and wastes the formulation.

After the liquid formulation has been applied to the metal, it is heated by any of many common techniques. For example, the coated metal may be convectionally heated, e.g. by baking in an oven, radiatively heated, e.g. by exposure to infrared radiation, or electrically heated, e.g. by passing electric current through it. Depending on the size of the object and the type of heating used, the coated metal is heated at different temperatures for differing periods of time. For example, it is sufficient to heat at 180° C. to 190° C. for 10 min., or at 160° C. for 40 min. Typically the coating changes its visible appearance upon hardening, indicating that the curing process is complete. In particular, the formulation initially has a slightly brown color, which changes to an intensive brown and finally to black when completely hardened. In the case where aluminum oxide is replaced by another heat conductive oxide (such as titanium dioxide) the final color of the hardened coating may be different (brown in the case of titanium dioxide).

The total curing time for the present formulation is between 10 min. and 60 min., as compared with 5 hours to 6 hours for prior art formulations. This substantial reduction in curing time, due to the amine hardeners, the synergistic effect of two accelerators, and the presence of calcium oxide and aluminum oxide, dramatically simplifies and quickens the process of applying the coating to a surface. Moreover, the time for curing is reduced further by the increased efficiency of heating due to the presence of aluminum oxide. This formulation also has the important benefit that the acidic gasses, such as hydrogen sulfide and sulfur oxide, are absorbed by chemical reactions with the epoxy groups of the liquid rubber and the alkaline agents, and are not released during the curing process as in the prior art.

The coating produced from the present formulation has very high impact resistance, improved thixotropy, and good pliability due to the presence of high-molecular-weight butadiene-nitrile rubber (BNR), which acts as a long backbone to the polymer structure.

Significantly, the present coating not only provides strong resistance to many different types of corrosion, but it also provides such protection to a wide range of metals. For example, this coating successfully protects many kinds of steels (including stainless steel), bronze, brass, zinc, aluminum, and cast iron. Moreover, because the polymermetallic interface of the coating provides outstanding bonding strength between these metals and the polymer matrix, this coating can be used as an effective primer for coatings composed of other kinds of polymers, for example, epoxies.

ILLUSTRATIONS AND EXAMPLES

To supplement the foregoing disclosure, the following examples are provided to illustrate specific aspects of the invention and particular techniques useful for making various coatings according to the invention.

To illustrate the dissolving of sulfur in amines, one may mix 3 grams of sulfur powder with 6 grams of the polyamine hardener-amino-amide curing agent UniRez 2810 at ambient temperature. Immediately, the yellow color of the sulfur changes to a bright orange, which gradually changes to brown as the sulfur is activated and dissolves. This exothermic reaction produces a temperature increase from 21° C. to 35° C. A viscous and homogeneous brown liquid results. Additional sulfur may be dissolved in the liquid, albeit with increasing difficulty as the liquid becomes highly viscous. If the amine hardener meta-xylene-diamine (MDXA) is used instead of UniRez, however, it is possible to dissolve up to 6 grams of sulfur into 6 grams of hardener while still maintaining relatively low viscosity. In this case the temperature rises to 41° C. Another alternative is the use of the amine hardener 1,3-bis-(aminomethyl)-cyclohexane (1,3-BAC), which permits the dissolving of up to 8 grams of sulfur in 6 grams of hardener. In this case the temperature of the mixture rises to 43° C. Those skilled in the art will appreciate that other amine hardeners may be used to similarly dissolve and activate sulfur, e.g. Jeffamine T-403 and the polyamine described in U.S. Pat. No. 5,175,231.

To illustrate the formation of liquid ebonite solution, one may mix 100 grams epoxidized low-molecular-weight polybutadiene (Ricopoxy 30 from Ricon Resin, Inc.) with 35 grams sulfur powder. Such polybutadiene preferably has viscosity 4500 cp and 6% oxirane oxygen content. After mixing for ten minutes, 10 grams of aluminum oxide (air abrasive powder no. 3 from S. S. White Pennwalt Equipment and Chemical Products Corporation) and 2 grams of UniRez are added. After mixing for 40 minutes the formulation should be absent any visible inhomogeneities, even under a microscope. Several components may then be added: 5 grams zinc oxide (obtained from LabPro, Inc.), 3 grams calcium oxide (from American International, Inc.), 3 grams 1,3-di-phenylguanidine (Vanax DPG from R. T. Vanderbilt Co., Inc.), 2 grams 2-mercaptobenzothiazole (from Eastman Organic Chemicals), and 1.5 grams Butadiene-Nitrile rubber (Chemigum P 612 from Goodyear Chemicals). Preferably, the rubber is first dissolved in a 15% ethyl acetate solution. The ethyl acetate can be removed under vacuum after the rubber is mixed thoroughly. In order to achieve complete homogeneity, the solution should be mixed for at least three hours. Preferably, the temperature during mixing is maintained near 45° C. The final formulation should be slightly brown with a viscosity near 510 poises. If the formulation is intended for coating a vertical metal surface, 5 grams of amorphous fumed silica (Cab-O-Sil grade M-5 from Cabot Corporation) can be added.

It may be observed that if the above formulation is prepared without the addition of Unirez, microscopic non-homogeneities remain present, which would lead to imperfections and reduced protective properties. The amine hardener, therefore, plays a demonstrable role in improving the homogeneity of the formulation. It may also be observed that without the addition of aluminum oxide, complete homogeneity is requires 20 hours of mixing, which is four times longer than the time required with the aluminum oxide. The aluminum oxide, therefore, also assists in the creation of a homogeneous mixture.

Rather than mixing the primary ingredients together all at once, as described above, they may alternatively be mixed in preliminary batches that are subsequently mixed. In particular, a first master batch is prepared by mixing 10 grams of aluminum oxide in 10 grams of Ricopoxy 30. A second master batch is prepared by mixing 5 grams of zinc oxide in 5 grams Ricopoxy 30. A third master batch is prepared by mixing 2 grams of mercaptobenzothiazole in 2 grams of Ricopoxy 30. A fourth master batch is prepared by mixing 3 grams of di-phenylguanidine in 2 grams of Unirez, and a fifth master batch is prepared by mixing 35 grams of sulfur in 80 grams of Ricopoxy 30. The master batches are then mixed together for 10 minutes, after which a solution of Chemigum and Cab-O-Sil is added and the formulation is mixed for 30 minutes.

As an alternative, the above formulation may be prepared with epoxidized polybutadiene (Poly BD 600 from Elf Atochem North America) instead of Ricopoxy 30. Another alternative is to substitute titanium oxide for aluminum oxide. Still another alternative is to use 1,3-BAC in place of Unirez, resulting in superior thixotropic properties. Even better thixotropic properties are obtained with the use of MXDA in place of Unirez. These various substitutions may be made separately or together.

A formulation prepared as originally described above may be spread over a metal surface to form a 0.1 mm thick layer. The coated metal sheets are then placed in a 160° C. oven for 45 minutes. The cured liquid ebonite coating thus produced has a 2000 psi adhesion to black steel, an abrasion resistance 2 times better than conventional cured epoxies, a less than 1% swelling in water, in salty water, in mineral oil, and in toluene, a tensile strength of 4800 psi at the break (nearly twice that of cured ebonite made from non-epoxidized liquid rubber), an elongation at the break of 6%, and a Youngs modulus of 220 ksi. The improved mechanical properties of the present coating can be attributed primarily to the formation of the continuous polymer matrix formed from the epoxy-amine bonds.

It may be observed that without the addition of Chemigum, the resulting coating cracks under slow bending at angles of 40 degrees. In contrast, with the presence of Chemigum the coating maintains integrity under slow bending at angles up to 90 degrees. It may also be observed that the substitution of MXDA for Unirez decreases the curing time from 40–50 minutes to only 20–25 minutes (at 160° C.). As an alternative or supplement to baking, the coating may be cured by exposure to infrared radiation. Using IR radiation can produce curing in a relatively short time compared with baking.

The superior durability of the present coating may be demonstrated by placing it in a 70 kHz ultrasonic cleaner. After 10 hours conventional epoxies experience traces of underfilm corrosion and peeling. In contrast, the coating of the present invention experienced no detectable defects, corrosion or peeling after over 100 hours of exposure. Surprisingly and significantly, the same results are obtained in the case where the coating was applied to a metal surface containing grease and rust. To further demonstrate the durability, metal sheets coated according to the present invention were attached to a motor shaft and immersed in contaminated sea water. After two hours of rotation at 3000 rpm, conventional coatings demonstrate observable corrosion, while no trace of defects in the inventors coating was present.

It will be clear to one skilled in the art that the above embodiments may be altered in many ways without departing from the scope of the invention. Accordingly, the scope of the invention should be determined by the following claims and their legal equivalents.

What is claimed is:

1. A method for protecting a metal, the method comprising:

forming a liquid mixture comprising epoxidized liquid rubber, polyamine and sulfur;

applying the mixture to the metal to form a coating; and heating the coating until it hardens.

2. The method of claim 1 wherein the step of forming a liquid mixture comprises mixing a combination of the sulfur and the polyamine with a combination of the sulfur and the epoxidized liquid rubber.

3. The method of claim 1 wherein the step of applying the mixture to the metal is adapted so that the coating thus formed has a thickness between 0.1 and 0.3 mm.

4. The method of claim 1 wherein the heating step is completed in less than one hour.

5. The method of claim 1 wherein the heating step comprises heating the coating to a temperature in the range 150° C. to 180° C.

6. The method of claim 1 wherein the liquid mixture further comprises a heat conducting agent chosen from the group consisting of micronized aluminum oxide and micronized titanium oxide.

7. The method of claim 1 wherein the liquid mixture further comprises an accelerator chosen from the group consisting of 2-mercapto benzothiazole and di-phenyl-guanidine.

8. The method of claim 1 wherein the liquid mixture further comprises butadiene-nitrile rubber.

9. A method for coating a metal, the method comprising:

dissolving sulfur in an amine to produce an amine solution, forming a mixture of the amine solution and an epoxidized liquid rubber, applying the mixture to the metal, and heating the applied mixture.

10. The method of claim 9 wherein the amine comprises a polyamine.

11. The method of claim 9 wherein the epoxidized liquid rubber comprises an epoxidized polydiene.

* * * * *